US012665853B2

(12) United States Patent
Sasidharan Pillai et al.

(10) Patent No.: US 12,665,853 B2
(45) Date of Patent: Jun. 23, 2026

(54) POLICY REMAPPING UPON NETWORK EVENTS

(71) Applicant: Cisco Technology, Inc., San Jose, CA (US)

(72) Inventors: Kiran Sasidharan Pillai, Fremont, CA (US); Rajagopalan Janakiraman, Cupertino, CA (US); Murukanandam Panchalingam, Dublin, CA (US); Muralidhar Annabatula, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 171 days.

(21) Appl. No.: 18/166,571

(22) Filed: Feb. 9, 2023

(65) Prior Publication Data

US 2024/0275727 A1     Aug. 15, 2024

(51) Int. Cl.
*H04L 47/2441*          (2022.01)

(52) U.S. Cl.
CPC ............................... *H04L 47/2441* (2013.01)

(58) Field of Classification Search
CPC ............. H04L 63/1425; H04L 63/0227; H04L 47/2441; H04L 41/0894; H04L 63/0263; H04L 63/102; H04L 47/20; H04L 45/22; H04L 47/24; H04L 63/20; H04L 45/70
See application file for complete search history.

(56) References Cited

U.S. PATENT DOCUMENTS

| | | | |
|---|---|---|---|
| 7,787,390 B1 * | 8/2010 | Orr ..................... | H04L 41/0681 709/224 |
| 8,458,301 B1 * | 6/2013 | Andrus ............... | H04L 63/1408 709/223 |
| 9,264,301 B1 | 2/2016 | Chua et al. | |
| 10,210,058 B1 * | 2/2019 | Srinath ................... | H04L 45/22 |
| 10,747,632 B2 * | 8/2020 | Bhakri ................ | G06F 11/3409 |

(Continued)

OTHER PUBLICATIONS

Abhashkumar, A. et al., "Running BGP in Data Centers at Scale," USENIX Symposium on Networked Systems Design and Implementation, Apr. 2021, 18 pages.

(Continued)

*Primary Examiner* — Tonia L Dollinger
*Assistant Examiner* — Linh T. Nguyen
(74) *Attorney, Agent, or Firm* — Edell, Shapiro & Finnan, LLC

(57) ABSTRACT

The techniques described herein relate to a method including: generating a first network policy and a second network policy at a forwarding device within a network, wherein the first network policy is applied to a first traffic classification and the second network policy is applied to a second traffic classification; obtaining first traffic from an endpoint device; classifying the first traffic with the first traffic classification; applying, at the forwarding device, the first network policy to the first traffic; obtaining, at the forwarding device, an indication of a network event within the network; obtaining second traffic from the endpoint device; classifying the second traffic with the second traffic classification in response to obtaining the indication of the network event; and applying, at the forwarding device, the second network policy to the second traffic.

20 Claims, 5 Drawing Sheets

(56) References Cited

U.S. PATENT DOCUMENTS

| | | | |
|---|---|---|---|
| 2011/0119397 A1* | 5/2011 | Evans ..................... | H04L 47/12 |
| | | | 709/235 |
| 2011/0173492 A1* | 7/2011 | Le Roux ................. | H04L 45/00 |
| | | | 714/4.11 |
| 2012/0300669 A1* | 11/2012 | Zahavi ................... | H04L 49/10 |
| | | | 370/254 |
| 2016/0142274 A1* | 5/2016 | Mulkey ............... | H04L 43/0823 |
| | | | 709/224 |
| 2016/0211988 A1 | 7/2016 | Lucas et al. | |
| 2017/0093924 A1* | 3/2017 | Loo ......................... | H04L 63/20 |
| 2019/0081852 A1* | 3/2019 | Nazar ................. | H04L 41/0695 |
| 2019/0238449 A1* | 8/2019 | Michael .................. | H04L 45/70 |
| 2019/0327155 A1 | 10/2019 | Drangula et al. | |
| 2020/0021514 A1* | 1/2020 | Michael ................ | H04L 45/124 |
| 2020/0036603 A1* | 1/2020 | Nieves ................... | H04L 47/12 |
| 2020/0235990 A1* | 7/2020 | Janakiraman ....... | H04L 41/0895 |
| 2021/0135995 A1 | 5/2021 | Saklikar et al. | |
| 2021/0279117 A1* | 9/2021 | Lehmann ........... | H04L 63/1416 |
| 2022/0159042 A1* | 5/2022 | Panchalingam .... | H04L 41/0806 |
| 2022/0159605 A1* | 5/2022 | Li ......................... | H04W 60/00 |
| 2023/0185640 A1* | 6/2023 | Zhang ................... | G06F 9/542 |
| | | | 719/318 |
| 2023/0308385 A1* | 9/2023 | Patil ....................... | H04L 45/28 |
| 2024/0089273 A1* | 3/2024 | Aslaner .............. | H04L 63/1416 |

OTHER PUBLICATIONS

Cisco, "Cisco APIC Layer 4 to Layer 7 Services Deployment Guide, Release 6.0(x)," https://www.cisco.com/c/en/us/td/docs/dcn/aci/apic/6x/l4-l7-configuration/cisco-apic-layer-4-to-layer-7-services-deployment-guide-60x.html, Jun. 2022, 194 pages.

* cited by examiner

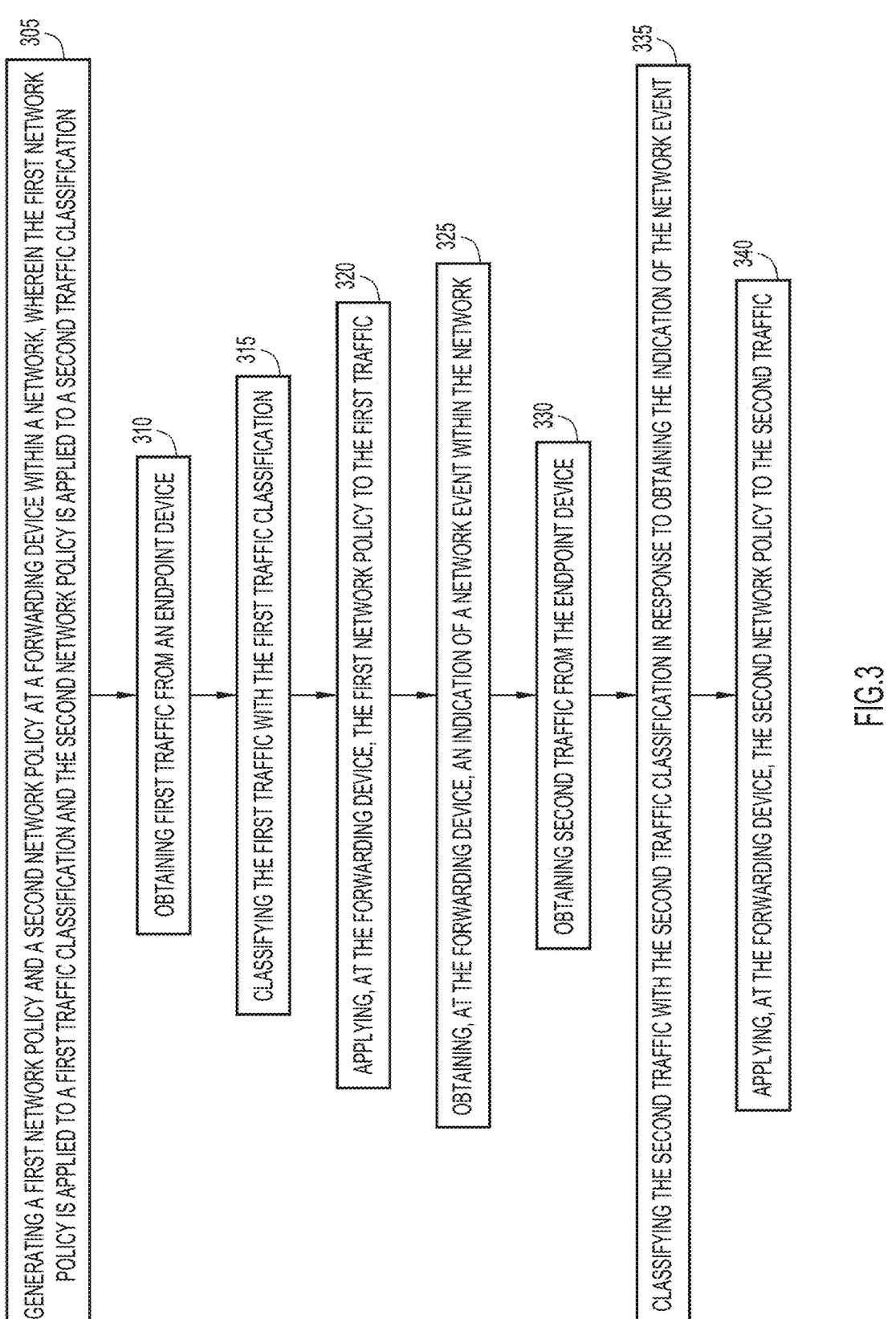

305 GENERATING A FIRST NETWORK POLICY AND A SECOND NETWORK POLICY AT A FORWARDING DEVICE WITHIN A NETWORK, WHEREIN THE FIRST NETWORK POLICY IS APPLIED TO A FIRST TRAFFIC CLASSIFICATION AND THE SECOND NETWORK POLICY IS APPLIED TO A SECOND TRAFFIC CLASSIFICATION

310 OBTAINING FIRST TRAFFIC FROM AN ENDPOINT DEVICE

315 CLASSIFYING THE FIRST TRAFFIC WITH THE FIRST TRAFFIC CLASSIFICATION

320 APPLYING, AT THE FORWARDING DEVICE, THE FIRST NETWORK POLICY TO THE FIRST TRAFFIC

325 OBTAINING, AT THE FORWARDING DEVICE, AN INDICATION OF A NETWORK EVENT WITHIN THE NETWORK

330 OBTAINING SECOND TRAFFIC FROM THE ENDPOINT DEVICE

335 CLASSIFYING THE SECOND TRAFFIC WITH THE SECOND TRAFFIC CLASSIFICATION IN RESPONSE TO OBTAINING THE INDICATION OF THE NETWORK EVENT

340 APPLYING, AT THE FORWARDING DEVICE, THE SECOND NETWORK POLICY TO THE SECOND TRAFFIC

CONTROL
LOGIC

520

I/O

510

NETWORK
PROCESSOR
UNIT(s)

508

I/O

512

STORAGE

506

MEMORY
ELEMENT(s)

504

PROCESSOR(s)

502

POLICY REMAPPING UPON NETWORK EVENTS

TECHNICAL FIELD

The present disclosure relates to implementing network policies, and in particular, remapping network policies in response to network property changes.

BACKGROUND

In networks, static network policies are applied between source and destination endpoints. The policies may allow, deny, or redirect traffic based upon certain criteria. Network events, such as interface failure events, network congestion events, latency/jitter changes, round trip time changes, application overloads, route withdraw events, and others, can cause path changes and posture changes for traffic. Due to these network events, the traffic should ideally belong to a different security class for purposes of applying network policies, for example, security policies and Quality of Service (QoS) policies.

The new policies implemented in response to the network changes may have different security rules, different QoS properties, and different service redirections than the original policies. In many cases, the security rules must be applied as soon as possible to avoid security holes. In other cases, proactive security redirections may be needed based on the above-described network events.

BRIEF DESCRIPTION OF THE DRAWINGS

FIG. 3 is a flowchart providing a process flow for implementing the disclosed policy remapping techniques, according to an example embodiment.

DETAILED DESCRIPTION

Overview

Figure 1:
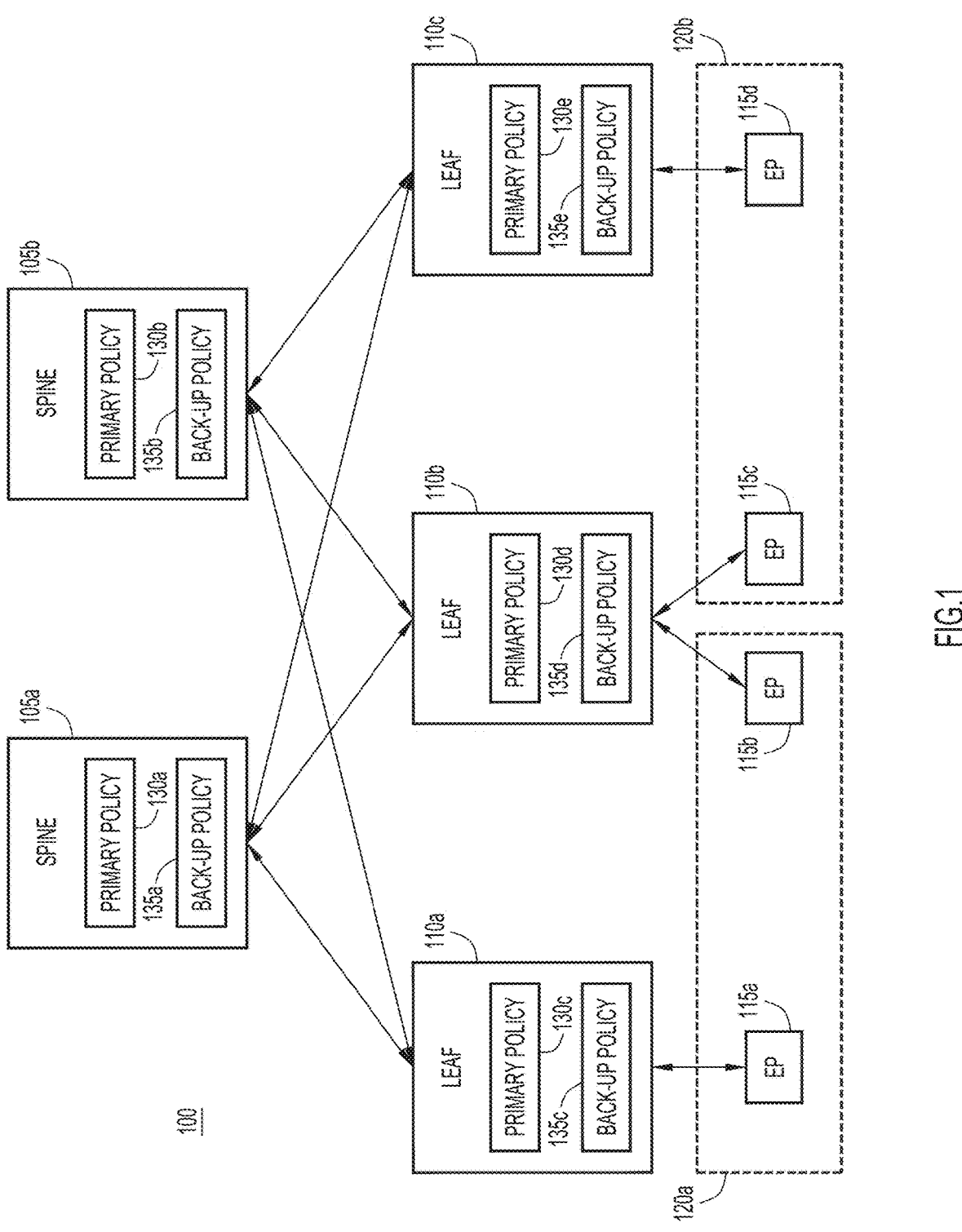
FIG. 1 illustrates a network environment configured to implement the policy remapping techniques of this disclosure, according to an example embodiment.

In some aspects, the techniques described herein relate to a method including: generating a first network policy and a second network policy at a forwarding device within a network, wherein the first network policy is applied to a first traffic classification and the second network policy is applied to a second traffic classification; obtaining first traffic from an endpoint device; classifying the first traffic with the first traffic classification; applying, at the forwarding device, the first network policy to the first traffic; obtaining, at the forwarding device, an indication of a network event within the network; obtaining second traffic from the endpoint device; classifying the second traffic with the second traffic classification in response to obtaining the indication of the network event; and applying, at the forwarding device, the second network policy to the second traffic.

In some aspects, the techniques described herein relate to an apparatus including: one or more network interfaces configured to send and receive network traffic; and one or more processors configured to: generate a first network policy and a second network policy, wherein the first network policy is applied to a first traffic classification and the second network policy is applied to a second traffic classification; obtain, via the one or more network interfaces, first traffic from an endpoint device; classify the first traffic with the first traffic classification; apply the first network policy to the first traffic; obtain an indication of a network event within a network; obtain, via the one or more network interfaces, second traffic from the endpoint device; classify the second traffic with the second traffic classification in response to obtaining the indication of the network event; and apply the second network policy to the second traffic.

In some aspects, the techniques described herein relate to one or more tangible, non-transitory computer readable mediums encoded with instructions, wherein the instructions, when executed by one or more processors, are operable to: generate a first network policy and a second network policy at a forwarding device within a network, wherein the first network policy is applied to a first traffic classification and the second network policy is applied to a second traffic classification; obtain first traffic from an endpoint device; classify the first traffic with the first traffic classification; apply, at the forwarding device, the first network policy to the first traffic; obtain, at the forwarding device, an indication of a network event within the network; obtain second traffic from the endpoint device; classify the second traffic with the second traffic classification in response to obtaining the indication of the network event; and apply, at the forwarding device, the second network policy to the second traffic.

Example Embodiments

In networks, static network policies are applied between the source and destination classes or endpoint groups to, for example, allow, deny, or redirect traffic to a service chain for application of advanced security. Network events such as interface down events, network congestion events, latency/jitter change events, round trip time change events, application overload events, route withdrawal events, nexthop down events, and gateway down events, among others, may cause path changes and posture changes for traffic. Due to the changes in the network, the traffic should ideally belong to a different traffic class for purposes of applying security policies, quality of service (QoS) policies and other network policies. The new network policies need to be applied dynamically without significant traffic loss as networks may not be able to wait for overall convergence of the new network policies throughout the network. Additionally, networks may not be able to wait for network administrators to step in to make the remappings to new network policies.

Furthermore, the new policies implemented in response to the network changes may have different rules, different QoS properties, and different service redirections than the original policies. Network policies should be applied as soon as possible to avoid security holes. In other cases, proactive security redirections may be needed based on events, such as congestion and changes in path latency/jitter/round trip times, to maintain service level agreements and to support proactive scale-out and load balancing of applications.

Accordingly, disclosed herein are techniques that may provide fast and dynamic remapping of network policies and classification based on various network events without significant traffic loss. For example, the disclosed techniques may remap policies in fewer than 50 ms. The disclosed techniques include pre-programming primary and back-up classifications and network policies in forwarding devices, fast propagation of re-mapping information upon network events, and acting on the re-mapped policies within a predetermined time period regardless of the network change. For example, the policy re-maps may be implemented such that they remap to the redundant/back-up policies on the order of one O(1) in big O notation.

With reference now made to FIG. 1, depicted therein is a network 100 in which the techniques of the present disclosure may be implemented. In the example of FIG. 1, network 100 is configured as a fabric network that includes spine switches 105a and 105b and leaf switches 110a-c. Endpoints 115a-d connect to network 100 via one of leaf switches 110a-c. Endpoints 115a-d are devices that are connected to the network directly or indirectly. They have an address, a location, attributes, and can be physical or virtual. Endpoint examples include servers, virtual machines, network-attached storage, or clients on the Internet. As also illustrated in FIG. 1, the endpoints 115a-d may be grouped into endpoint groups 120a and 120b.

An endpoint group is a managed object that is a named logical entity that contains a collection of endpoints. Endpoint groups are decoupled from the physical and logical topology of network 100. Endpoint membership in an EPG can be dynamic or static. Network 100 may contain application endpoint groups, Layer 2 external outside network instance endpoint groups, Layer 3 external outside network instance endpoint groups, and management endpoint groups for out-of-band or in-band access, among others. The endpoints contained within endpoint groups 120a and 120b, respectively, contain endpoints that have common policy requirements such as security, virtual machine mobility (VMM), QoS, or Layer 4 to Layer 7 services. Accordingly, endpoints 115a and 115b will share common policy requirements, as will endpoints 115c and 115d, respectively. Rather than configure and manage endpoints 115a and 115b individually, they are placed in endpoint group 120a and are managed as a group. Similarly, endpoints 115c and 115d are placed in endpoint group 120b and are managed as a group. Accordingly, policies apply to endpoint group 120a or endpoint group 120b, not to individual endpoints 115a-d.

According to the techniques disclosed herein, the elements of network 100 are pre-programmed with primary policies 130a-e and back-up policies 135a-e. Primary policies 130a-e apply to a first endpoint group, while the back-up policies 135a-e apply to a second endpoint group, which is used to reclassify traffic from the first endpoint group in response to network events. Back-up policies 135a-e may not apply to endpoints currently communicating via network 100. Instead, back-up policies 135a-e may be configured to be applied against traffic only in response to changes in network 100. For example, primary policies 130a-e may be applied to traffic associated with endpoints 115a and 115b due to their inclusion in endpoint group 120a. Back-up policies 135a-e are also configured to be applied to traffic associated with endpoints 115a and 115b, but only in response to a change in network conditions. According to the disclosed techniques, if the change in network conditions is determined, back-up policies 135a-e are implemented in place of primary policies 130a-e by leaf switches 110a and 110b reclassifying the traffic associated with endpoints 115a and 115b from endpoint group 120a to a new endpoint group to which back-up policies 135a-e are applied. Furthermore, because spine switches 105a and 105b and leaf switches 110a-c are pre-programmed with back-up policies 135a-e, these policies may be quickly implemented within network 100 without having to wait for overall convergence of the new network policies throughout the network 100 and/or without having to wait for network administrators to step in to make the remapping to new network policies. Instead, the ingress nodes of network 100, in this case leaf switches 115a-c, are configured to reclassify the appropriate traffic from a classification to which the primary policies 130a-e apply (e.g., endpoint group 120a) to a classification to which back-up policies 135a-e apply (e.g., a new endpoint group). Furthermore, because the reclassification takes place at the endpoint group level, as opposed to the endpoint level, the reclassification takes place with fewer touch points.

The above-described reclassification by leaf switches 110a and 110b (as well as leaf switch 110c for endpoint groups associated with endpoint 115d) may take place extremely quickly, such as on the order of one operation (i.e., on the order of one O(1) in big O notation) in the switching forwarding pipeline, or on the order of less than 50 ms. The fast switchover may be facilitated by implementing the switchover in the silicon of the Application Specific Integrated Circuit (ASIC) of the switch device. For example, the reclassification of the traffic by the leaf switches may be implemented by performing a table look-up in the hardware of the switch device. More specifically, a look-up table may be queried based upon the current endpoint group of the traffic and a signal associated with the change in network conditions (examples of which are described below). Based upon these two criteria, the look-up in the switch hardware may return an indication of a second endpoint group which is used to reclassify the traffic for application of the back-up policies.

According to the specific example of FIG. 1, primary policies 130a-e apply to a first endpoint group, such as endpoint group 120a. Network conditions, such as changes in path latency/jitter/round trip times, may require a switch to back-up policies 135a-e to, for example, ensure that service level agreement requirements are met. To implement this switch, leaf switches 110a-c will receive an indication of the change in path latency/jitter/round trip times, and perform a look-up in a table contained in the switch's hardware. The result of the table look-up will be a new endpoint group. Leaf switches 110a-c will reclassify the traffic coming from the endpoints of endpoint group 120a to this new endpoint group so that the back-up policies will be applied to the traffic ensuring that the service level agreement is met. In other words, leaf switches 110a and 110b will reclassify the traffic received from endpoints 115a and 115b (i.e., the endpoints belonging to endpoint group 120a) such that the traffic is reclassified to another endpoint group to which back-up policies 135a-e are applied.

According to the example above, the new endpoint group to which the traffic associated with endpoint group 120a is reclassified is a completely new endpoint group. In other words, the new endpoint group was not associated with any traffic prior to the reclassification. However, the disclosed techniques may also reclassify traffic from endpoint group 120a to another pre-existing endpoint group, such as endpoint group 120b. For example, the result of the table look-up described above may indicate that traffic associated with endpoint group 120a should be reclassified to be associated with endpoint group 120b. Accordingly, the traffic associated with endpoints 115a and 115b may be reclassified to be associated with endpoint group 120*b*, resulting in the traffic from all four of endpoints 115*a-d* being classified as part of endpoint group 120*b*.

Figure 2:
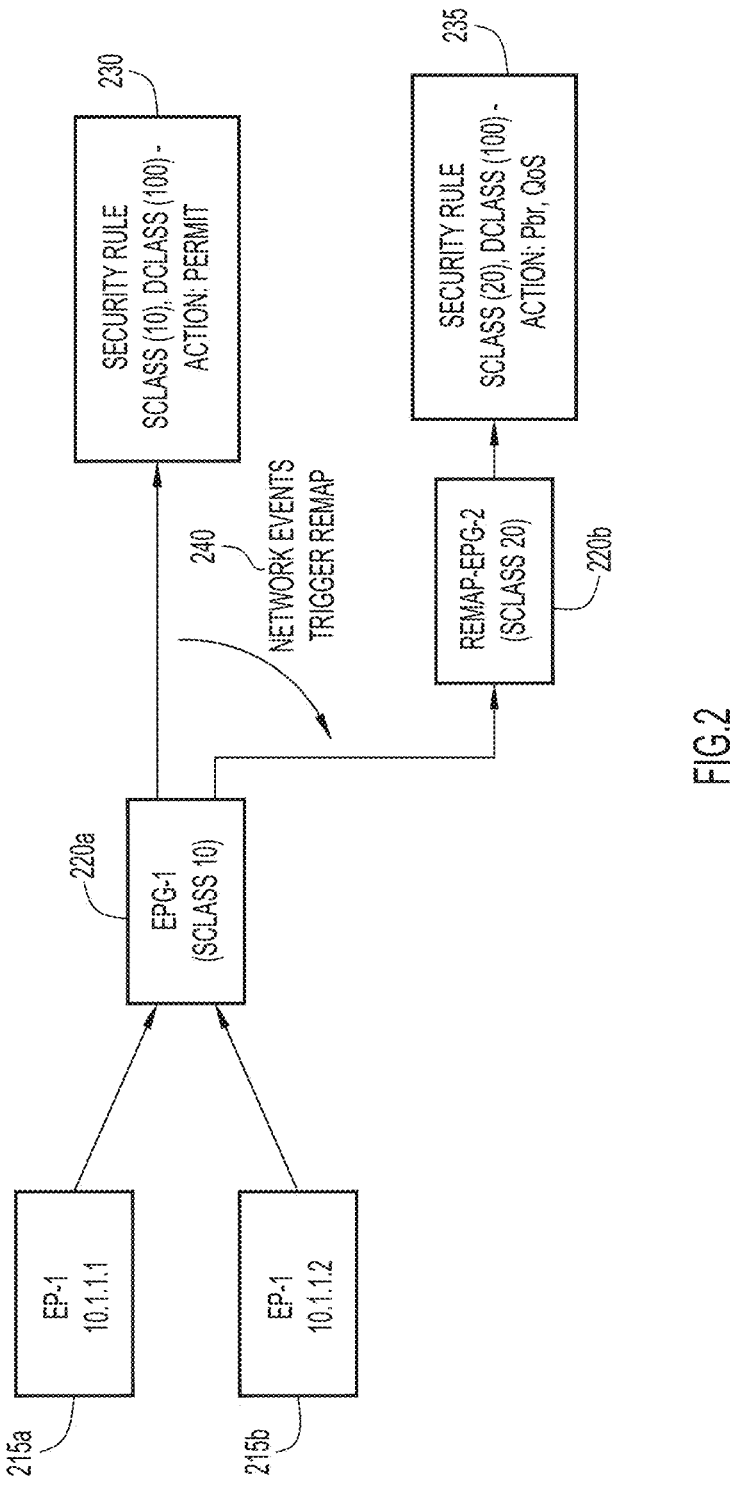
FIG. 2 is a forwarding plane pipeline of a network forwarding device configured to implement the disclosed policy remapping techniques, according to an example embodiment.

An example of the above-described reclassification techniques will now be described with reference to FIG. 2. Specifically, FIG. 2 illustrates a forwarding plane pipeline 200 implemented by a forwarding network device to classify and apply policies to traffic associated with endpoints 215*a* and 215*b*. Endpoint 215*a* has an address of 10.1.1.1 and is initially associated with endpoint group 220*a*. Accordingly, traffic received from endpoint 215*a* is classified with a source classification or "SCLASS" of 10. Due to this classification of endpoint 215*a* traffic, network policy 230 is applied to the traffic. As illustrated in FIG. 2, network policy 230 is a security rule that permits traffic whose source is an endpoint within endpoint group 220*a* (as indicated by the source class or "Sclass(10)" criteria) and whose destination is an endpoint within an endpoint group whose destination class or "DCLASS" is 100 (as indicated by the "Dclass (100)" criteria). Network policy 230 would also be applied to traffic sent from endpoint 215*b* destined for endpoints within the endpoint group having a DCLASS of 100 as endpoint 215*b* is also within endpoint group 220*a*, which results in its traffic also being classified with an SCLASS of 10.

At some point, a network event 240 takes place that serves as a trigger for the leaf switch that classifies the traffic from endpoints 215*a* and 215*b* to change. For example, an interface down event, a network congestion event, a latency/jitter change event, a round trip time change event, an application overload event, a route withdrawal event, a nexthop down event, and/or a gateway down event, may take place within the network, resulting in path and/or posture changes for traffic sent from endpoints 215*a* and 215*b*. In response to the detection of network event 240, traffic from endpoint group 220*a* is reclassified as traffic from SCLASS 10 to SCLASS 20. In other words, traffic from endpoints 215*a* and 215*b* is reclassified to remap from endpoint group 220*a* to endpoint group 220*b*.

Once the traffic sent from endpoints 215*a* and 215*b* is reclassified with an SCLASS of 20, network policy 235 will be applied to their traffic destined for endpoints within the endpoint group having a DCLASS of 10. Specifically, where network policy 230 applies to traffic with an SCLASS of 10, network policy 235 applies to traffic having an SCLASS of 20. Where network policy 230 simply permits traffic from endpoint group 220*a* destined for the endpoint group having a DCLASS of 100, network policy 235 implements different actions. Specifically, network policy 235 implements Policy Based Routing (PBR) and QoS actions for the traffic.

The process illustrated in FIG. 2 may be generalized to the process provided by the flowchart 300 now described with reference to FIG. 3. Flowchart 300 begins in operation 305 in which a first network policy and a second network policy are generated at a forwarding device within a network. The first network policy is configured to apply to traffic having a first traffic classification, and the second network policy is configured to apply to traffic having a second traffic classification. Operation 305 may be embodied as the pre-programming of primary and back-up network policies within a network device, such as spine switches 105*a* and 105*b* and/or leaf switches 110*a-c* of FIG. 1.

In operation 310, first traffic is obtained from an endpoint device. Accordingly, operation 310 may be embodied as leaf switch 110*a* of FIG. 1 obtaining traffic from endpoint 115*a*, leaf switch 110*b* obtaining traffic from endpoint 115*b* or endpoint 115*c*, or leaf switch 110*c* obtaining traffic from endpoint 115*d*.

Continuing in operation 315, the first traffic is classified with the first traffic classification. For example, if the first endpoint is associated with an endpoint group, the traffic may be classified as being traffic from that source endpoint group. According to other examples, if the traffic is destined for an endpoint device within a particular endpoint group, the traffic may be classified with that destination endpoint group. Therefore, operation 315 may be embodied as classifying the traffic with a source classification or SCLASS, a destination classification or DCLASS, or both, as illustrated in FIG. 2.

In operation 320, the first network policy is applied to the first traffic at the security device. Accordingly, operation 320 may be embodied as the application of a primary network policy 130*a-e* by a spine switch 105*a*/105*b* or a leaf switch 110*a*/110*b*/110*c*, as illustrated and described with reference to FIG. 1. Operation 320 may also be embodied as the application of network policy 230 as illustrated and described with reference to FIG. 2.

In operation 325, an indication of a network event is obtained at the forwarding device. Accordingly, operation 325 may be embodied as the obtaining of an indication of network event 240 of FIG. 2. As described in detail below, operation 325 may be embodied as receipt of a message indicating a network event, such as receipt of a Bidirectional Forwarding Detection (BFD) protocol message. Operation 325 may also be embodied as the detection of a network event by the forwarding device.

Next, in operation 330, second traffic from the endpoint device is obtained. Accordingly, operation 330 may be embodied as leaf switch 110*a* of FIG. 1 obtaining traffic from endpoint 115*a*, leaf switch 110*b* obtaining traffic from endpoint 115*b* or endpoint 115*c*, or leaf switch 110*c* obtaining traffic from endpoint 115*d*. This second traffic is not classified using the first traffic classification. Instead, as indicated in operation 335, this second traffic is classified with the second classification, with the change to the second classification being in response to obtaining the indication of the network event.

Finally, the forwarding device applies the second network policy to the second traffic in operation 340. Accordingly, operation 340 may be embodied as the application of network policy 235 to traffic after the remapping of endpoints 215*a* and 215*b* from the endpoint group with the SCLASS of 10 to the endpoint group with the SCLASS of 20, as illustrated in FIG. 2. Operation 340 may also be embodied as the application of back-up policies 135*a-e*, as described above with reference to FIG. 1.

The processes described above with reference to FIGS. 2 and 3 illustrate the aspects of the disclosed techniques directed to the reclassification of traffic and the application of the primary and back-up policies thereto. However, the disclosed techniques also include other aspects that provide for the identification of network events and their fast propagation through the network. Accordingly, the following additional aspects of the disclosed techniques will now be described:

1. Detection of policy changes in network events.
2. Fast propagation of security class changes upon network events.
3. Fast fixing and remapping of network policies.
4. Protocols propagating traffic classes for prefix classification cases.

Beginning with the detection of policy changes in network events, it is the network edge points or edge nodes where classifications and security rules are applied. In a fabric network like network 100 of FIG. 1, the leaf switches 115*a-c* serve as edge nodes, applying traffic classification and security rules. Accordingly, the edge nodes monitor the "liveness" of traffic classifications and associated traffic attributes. As used herein, "liveness" refers to periodic acknowledgement or hello packets sent within a network between the network elements. If a network element does not provide such periodic messages, the element is declared "not alive" or "dead." In the event of network failures such as interface down events, nexthop down events, route withdraws, congestion, etc., the edge nodes evaluate the impact on the traffic classification. The edge nodes associate these traffic classifications with traffic parameters which allows for the reclassification of traffic in response to changing traffic patterns, as described above with reference to FIGS. 2 and 3.

Consider a first example in which an endpoint with address "10.10.10.10" is classified into "SCLASS 100" based on the prefix "10.10.0.0/16." A route-withdraw of 10.10.0.0/16 from the peering router causes "SCLASS 100" to be inactive in that edge node. The edge node would detect this route withdraw change. Based upon this detected change, the edge node would propagate an indication of the change using the techniques described below. Similar changes may be detected by edge nodes in response to other network changes such as an interface being "down" or inoperable, a Virtual Local Area Network (VLAN) being down, and/or a nexthop down scenario.

Edge nodes may also detect changes to traffic attributes. For example, a particular traffic classification may need to meet one or more traffic requirements due to, for example, a service level agreement. Other traffic attributes may not be required, but may be desirable for fast and efficient network communication. Failure to meet these attributes may require changes in network policies. Accordingly, the edge nodes that classify endpoint traffic may detect when the traffic fails to meet the required or desired attributes, and will propagate an indication of a network event so that the change in network policy may be implemented throughout the network.

For example, an endpoint under prefix 10.10.0.0/16 with a traffic latency requirement of less than 1 ms is associated with "SCLASS 500." Protocols such as BFD may measure latency to an endpoint. Edge nodes may detect when the latency for traffic with this classification exceeds the "less than 1 ms" requirement, which would result in the edge node propagating an indication of the network change.

According to a second example, an endpoint under prefix 10.10.0.0/16 should have zero traffic tail packet drops or random early detection (RED) packet drops. To ensure there are no such drops, the traffic from this endpoint is classified into "SCLASS 600." If the packet forwarding ASIC detects or makes such drops, the edge node may detect the drops and propagate an indication that such drops are taking place in the identified classification.

According to a third example, traffic from an endpoint under prefix 10.10.0.0/16 should experience no more than 1% RED drops, and therefore, is classified into "SCLASS 1200." If the edge node detects a higher percentage of RED drops, the edge node may detect the drops and propagate an indication that such drops are taking place in the identified classification.

According to a fourth example, a VLAN interface on an edge node without any drops is classified as "SCLASS 800."

If the VLAN interface begins experiencing drops, the edge node may detect the drops and propagate an indication that such drops are taking place in the identified classification.

As indicated above, a node that detects changes in the traffic classification or its activeness "fast propagates" this information to other interested nodes who enforce security rules in the network. One method to propagate this information is multi-hop BFD. According to the disclosed techniques, existing multi-hop BFD is enhanced to carry additional discriminators and sub-discriminators to propagate traffic classification information and its liveness, along with replying to the regular liveness response for the BFD hellos from other nodes. There are optimal ways of carrying classification sub-discriminators in BFD packets, such as pre-calculated digest/hash values between the nodes.

Figure 4:
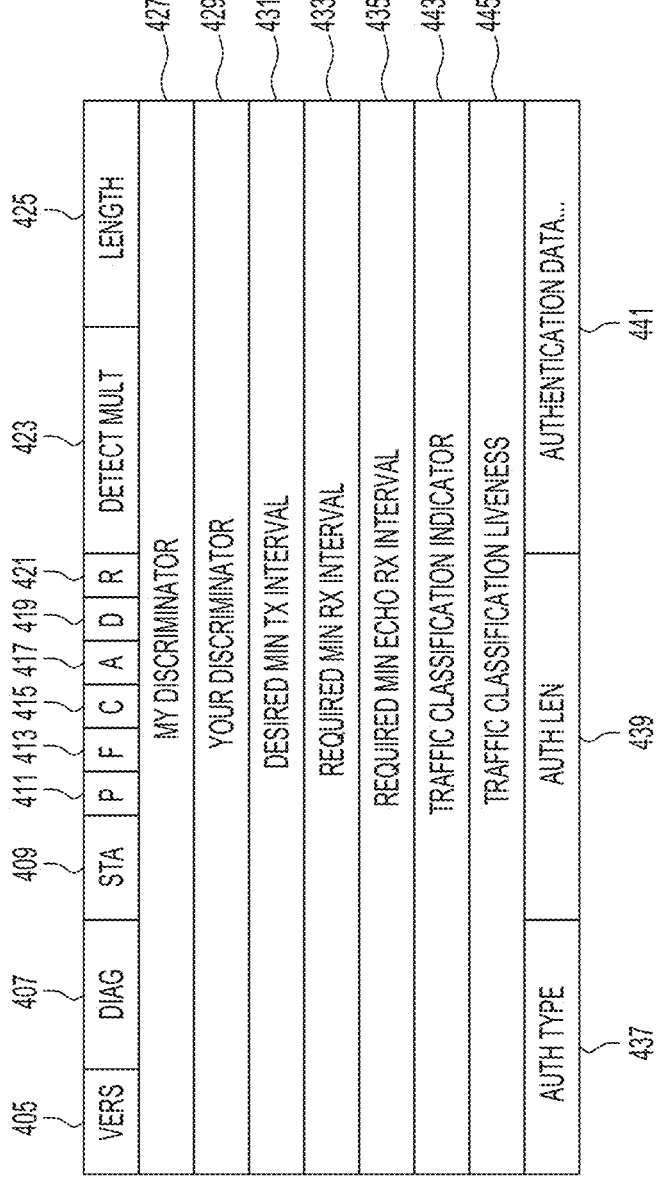
FIG. 4 is an example Bidirectional Forwarding Detection (BFD) protocol message configured to implement the disclosed policy remapping techniques, according to an example embodiment.

For example, illustrated in FIG. 4 is a BFD hello message 400 configured to include traffic classification and status indicators. BFD hello message 400 includes the traditional BFD elements, such as version indicator 405, diagnostic indicator 407, session state indicator 409, poll indicator 411, final indicator 413, control plane independent indicator 415, authentication present indicator 417, demand indicator 419, reserved portion 421, detection time multiplier 423, packet length indicator 425, transmitting node discriminator 427, receiving node discriminator 429, desired minimum transmit time interval 431, required minimum receive time interval 433, required minimum echo receive interval 435, authentication type indicator 437, authentication section length indicator 439, and authentication data 441.

In addition to the traditional elements, BFD hello message 400 includes traffic classification indicator 443 and traffic classification liveness indicator 445. Traffic classification indicator 443 may indicate a particular traffic classification for which the BFD hello message 400 is being sent, while traffic classification liveness indicator 445 indicates the current status of the classification. Accordingly, if a node detects that the classification "SCLASS 900" for prefix 15.15.0.0/10 is withdrawn, that node would propagate a BFD hello message 400 that includes an indication of "SCLASS 900" in traffic classification indicator 443 with a status "down" in traffic classification liveness indicator 445. According to another example, if a node detects application congestion above the SLA on a VLAN interface classified as "SCLASS 1500" to which a network appliance is attached, the node may propagate a BFD hello message 400 that indicates "SCLASS 1500" in traffic classification indicator 443 and "inactiveness" in traffic classification liveness indicator 445 to the nodes that are monitoring the transmitting node.

Once a node receives an indication of the network event through, for example, receipt of a BFD hello message as described above, the node will take actions to "fast fix" the issues introduced by the network event. For example, the ingress node that enforces network policies for the traffic classification may reclassify the affected traffic as described above with reference to FIGS. 1-3. As described above, each primary network policy is installed with a back-up policy. Furthermore, each node may include a Fast Re-Map Policy (FRP), similar to a Fast Re-Route (FRR) policy, at the node.

For example, a node may include the following original policy:

(SCLASS, DCLASS)=>Primary Nexthop/Gateway,
        Marking for QoS, etc.

Accordingly, the policy indicates a primary nexthop or gateway and a particular QoS marking, among other parameters, for traffic classified with a particular source class and destination class combination. A back-up policy that would be implemented in response to the destination class being inactive may indicate the following:

(SCLASS, New DCLASS)=>BackupNexthop/Gateway, New Marking for QoS, etc.

The backup policies may be pre-calculated based upon different considerations, such as back-up path reachability such that existing routing backup pre-computations are leveraged. For example, the back-up path may be pre-calculated using Loop Free Alternatives (LFAs) in Interior Gateway Protocol (IGPs) gateways, BGP FRRs, Topology Independent LFAs (TI-LFAs), Resource Reservation Protocol-Traffic Engineering (RSVP-TE) primary/backup/bypass Label Switched Paths (LSPs), and other techniques. The new destination class associated with the backup paths is used for the security rules in the case of pure prefix-based classifications. A backup policy with a new destination class may be pre-calculated using regular best-effort routing onto a new gateway, or use service graphs and provide additional marking for QoS considerations.

The node applying the network traffic classifications and policies needs to monitor the primary node/gateway using multi-hop BFD, with additional discriminators and flags to indicate the interest in security class aliveness, as described above with reference to FIG. 4. The remote BFD node replies back whenever there is a lack of liveness for a particular classification. The receiving nodes need to act on this information and do a fast switchover to a backup policy path. With the pre-computed and remapped backup policy, the switchover may be achieved in the forwarding ASIC to achieve less than 50 ms fast failover.

The above-described fast-propagation of back-up policies may be particularly applicable to, for example:

1. Customer traffic traversing the Internet due to network failure in a secure network.
2. VM migration from one site to another site requiring dynamic security service graph insertion.
3. Dynamic security remapping and traffic redirection due to oversubscription of certain service appliances or network congestions.

The disclosed techniques may also be implemented using network convergence techniques to propagate the network events. For example, for prefix-based classifications and network policies, the IGPs (e.g., Intermediate System-to-Intermediate System (IS-IS), Open Shortest Path First (OSPF) and BGP protocols) propagate traffic classification information across the network. Accordingly, even without multi-hop BFD, routing convergence may carry traffic classification information and achieve a best-effort switch to the back-up policy. The network convergence techniques may also invalidate the old traffic classifications and the prefix associations from the network. BGP packets may carry this information in its path attributes for Network Layer Reachability Information (NLRI). OSPF may carry this information in its Link State Advertisement (LSA) information for network prefixes. Similarly, IS-IS may carry traffic classification information in its LSPs. Additional sub-Type Length Values (TLVs) may be added to the protocol messages to support the disclosed techniques.

Figure 5:
FIG. 5 is a functional block diagram of a processing device configured to implement the disclosed policy remapping techniques, according to an example embodiment.

Referring to FIG. 5, FIG. 5 illustrates a hardware block diagram of a computing device 500 that may perform functions associated with operations discussed herein in connection with the techniques depicted in FIGS. 1-4. In various embodiments, a computing device or apparatus, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with the teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity, and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source, and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques disclosed herein are directed to:

1. Pre-programming and dynamic mapping of an endpoint group to another endpoint group in the switching forwarding pipeline and re-classification of traffic upon networking events. This reclassification may take place on the order of one operation. This optional fast remapping is done for source and destination endpoint groups in the forwarding pipeline before network policies are applied to the traffic. These reclassification techniques may be implemented in the silicon of a switch ASIC.

2. Pre-programming the redundant/backup security classifications and policies used to perform a dynamic and fast (<50 ms) remap to the backup security policies based on network events.

3. Communication of the security classes impacted by network events to the interested routers by the node that detects the events.

4. Security class associations with network traffic attributes such as congestion, delay, latency, jitter, etc.

Accordingly, in some aspects, the techniques described herein relate to a method including: generating a first network policy and a second network policy at a forwarding device within a network, wherein the first network policy is applied to a first traffic classification and the second network policy is applied to a second traffic classification; obtaining first traffic from an endpoint device; classifying the first traffic with the first traffic classification; applying, at the forwarding device, the first network policy to the first traffic; obtaining, at the forwarding device, an indication of a network event within the network; obtaining second traffic from the endpoint device; classifying the second traffic with the second traffic classification in response to obtaining the indication of the network event; and applying, at the forwarding device, the second network policy to the second traffic.

In some aspects, the techniques described herein relate to a method, wherein the network event includes an interface down event, a network congestion event, a latency change event, a jitter change event, a round trip time change event, an application overload event, a route withdrawal event, a nexthop down event, or a gateway down event.

In some aspects, the techniques described herein relate to a method, wherein classifying the first traffic with the first traffic classification includes classifying the first traffic with a first endpoint group classification; and wherein classifying the second traffic with the second traffic classification includes classifying the second traffic with a second endpoint group classification.

In some aspects, the techniques described herein relate to a method, wherein classifying the second traffic with the second endpoint group classification includes: performing a look-up in a table stored in hardware of the forwarding device based upon the first endpoint group classification and the indication of the network event; and obtaining an indication of the second endpoint group classification in response to the look-up.

In some aspects, the techniques described herein relate to a method, wherein the first endpoint group classification includes a source classification.

In some aspects, the techniques described herein relate to a method, wherein the forwarding device includes a leaf switch of a fabric network.

In some aspects, the techniques described herein relate to a method, wherein obtaining the indication of the network event includes obtaining a Bidirectional Forwarding Detection protocol message.

In some aspects, the techniques described herein relate to a method, wherein obtaining the indication of the network event includes detecting the network event within the network.

In some aspects, the techniques described herein relate to a method, further including providing a Bidirectional Forwarding Detection protocol message to another forwarding device within the network indicating the network event.

In some aspects, the techniques described herein relate to a method, further including determining, from the indication of the network event, that a service level agreement for traffic from the endpoint device may not be met by application of the first network policy due to the network event.

In some aspects, the techniques described herein relate to an apparatus including: one or more network interfaces configured to send and receive network traffic; and one or more processors configured to: generate a first network policy and a second network policy, wherein the first network policy is applied to a first traffic classification and the second network policy is applied to a second traffic classification; obtain, via the one or more network interfaces, first traffic from an endpoint device; classify the first traffic with the first traffic classification; apply the first network policy to the first traffic; obtain an indication of a network event within a network; obtain, via the one or more network interfaces, second traffic from the endpoint device; classify the second traffic with the second traffic classification in response to obtaining the indication of the network event; and apply the second network policy to the second traffic.

In some aspects, the techniques described herein relate to an apparatus, wherein the network event includes an interface down event, a network congestion event, a latency change event, a jitter change event, a round trip time change event, an application overload event, a route withdrawal event, a nexthop down event, or a gateway down event.

In some aspects, the techniques described herein relate to an apparatus, wherein the one or more processors are further configured to classify the first traffic with the first traffic classification by classifying the first traffic with a first endpoint group classification; and wherein the one or more processors are further configured to classify the second traffic with the second traffic classification by classifying the second traffic with a second endpoint group classification.

In some aspects, the techniques described herein relate to an apparatus, wherein the one or more processors are further configured to classify the second traffic with the second endpoint group classification by: performing a look-up in a table stored in the one or more processors based upon the first endpoint group classification and the indication of the network event; and obtaining an indication of the second endpoint group classification in response to the look-up.

In some aspects, the techniques described herein relate to an apparatus, wherein the one or more processors are further configured to obtain the indication of the network event by obtaining a Bidirectional Forwarding Detection protocol message.

In some aspects, the techniques described herein relate to an apparatus, wherein the one or more processors are further configured to obtain the indication of the network event by detecting the network event within the network.

In some aspects, the techniques described herein relate to one or more tangible, non-transitory computer readable mediums encoded with instructions, wherein the instructions, when executed by one or more processors, are operable to: generate a first network policy and a second network policy at a forwarding device within a network, wherein the first network policy is applied to a first traffic classification and the second network policy is applied to a second traffic classification; obtain first traffic from an endpoint device; classify the first traffic with the first traffic classification; apply, at the forwarding device, the first network policy to the first traffic; obtain, at the forwarding device, an indication of a network event within the network; obtain second traffic from the endpoint device; classify the second traffic with the second traffic classification in response to obtaining the indication of the network event; and apply, at the forwarding device, the second network policy to the second traffic.

In some aspects, the techniques described herein relate to one or more tangible, non-transitory computer readable mediums, wherein the network event includes an interface down event, a network congestions event, a latency change event, a jitter change event, a round trip time change event, an application overload event, a route withdrawal event, a nexthop down event, or a gateway down event.

In some aspects, the techniques described herein relate to one or more tangible, non-transitory computer readable mediums, wherein the instructions operable to classify the first traffic with the first traffic classification include instructions operable to classify the first traffic with a first endpoint group classification; and wherein the instructions operable to classify the second traffic with the second traffic classification include instructions operable to classify the second traffic with a second endpoint group classification.

In some aspects, the techniques described herein relate to one or more tangible, non-transitory computer readable mediums, wherein the instructions operable to classify the second traffic with a second endpoint group classification include instructions operable to: perform a look-up in a table stored in hardware of the forwarding device based upon the first endpoint group classification and the indication of the network event; and obtain an indication of the second endpoint group classification in response to the look-up.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
generating a first network policy and a second network policy at a forwarding device within a network, wherein the first network policy is pre-programmed to a first traffic classification and the second network policy is pre-programmed to a second traffic classification, wherein the second network policy is a back-up policy of the first network policy;
obtaining first traffic from an endpoint device;
classifying the first traffic with the first traffic classification;
applying, at the forwarding device, the first network policy to the first traffic;
obtaining, at the forwarding device, an indication of a network event within the network;
obtaining second traffic from the endpoint device; and
remapping the second traffic within a predetermined time period by:
classifying the second traffic with the second traffic classification in response to obtaining the indication of the network event; and
applying, at the forwarding device, the second network policy to the second traffic in place of the first network policy in response to the indication of the network event, wherein the second network policy is pre-programmed at the forwarding device prior to the network event.

2. The method of claim 1, wherein the network event comprises an interface down event, a network congestion event, a latency change event, a jitter change event, a round trip time change event, an application overload event, a route withdrawal event, a nexthop down event, or a gateway down event.

3. The method of claim 1, wherein classifying the first traffic with the first traffic classification comprises classifying the first traffic with a first endpoint group classification, and
wherein classifying the second traffic with the second traffic classification comprises classifying the second traffic with a second endpoint group classification, which is a new endpoint group classification that was not associated with any traffic prior to classifying the second traffic.

4. The method of claim 3, wherein classifying the second traffic with the second endpoint group classification comprises:

performing a look-up in a table stored in hardware of the forwarding device based upon the first endpoint group classification and the indication of the network event; and
obtaining an indication of the second endpoint group classification in response to the look-up.

5. The method of claim 3, wherein the first endpoint group classification comprises a source classification.

6. The method of claim 1, wherein the forwarding device comprises a leaf switch of a fabric network.

7. The method of claim 1, wherein obtaining the indication of the network event comprises obtaining a Bidirectional Forwarding Detection protocol message.

8. The method of claim 1, wherein obtaining the indication of the network event comprises detecting the network event within the network.

9. The method of claim 7, further comprising providing a Bidirectional Forwarding Detection protocol message to another forwarding device within the network indicating the network event.

10. The method of claim 1, further comprising determining, from the indication of the network event, that a service level agreement for traffic from the endpoint device may not be met by application of the first network policy due to the network event.

11. The method of claim 1, wherein classifying the first traffic with the first traffic classification comprises classifying the first traffic with a first endpoint group classification,
wherein classifying the second traffic with the second traffic classification comprises classifying the second traffic with a second endpoint group classification that is applied to reclassify the second traffic from the first endpoint group classification to the second endpoint group classification in response to the network event, wherein a plurality of endpoint entities within the first endpoint group classification share the first network policy and the second network policy, which are at least one of: network access policies or security policies.

12. The method of claim 1, wherein the second traffic is remapped within the predetermined time period regardless of the network event.

13. An apparatus comprising:
one or more network interfaces configured to send and receive network traffic; and
one or more processors configured to:
generate a first network policy and a second network policy, wherein the first network policy is pre-programmed to a first traffic classification and the second network policy is pre-programmed to a second traffic classification, wherein the second network policy is a back-up policy of the first network policy;
obtain, via the one or more network interfaces, first traffic from an endpoint device;
classify the first traffic with the first traffic classification;
apply the first network policy to the first traffic;
obtain an indication of a network event within a network;
obtain, via the one or more network interfaces, second traffic from the endpoint device; and
remap the second traffic within a predetermined time period by:
classifying the second traffic with the second traffic classification in response to obtaining the indication of the network event; and
applying the second network policy to the second traffic in place of the first network policy in response to the indication of the network event, wherein the one or more processors are configured to pre-program the second network policy prior to the network event.

14. The apparatus of claim 13, wherein the network event comprises an interface down event, a network congestion event, a latency change event, a jitter change event, a round trip time change event, an application overload event, a route withdrawal event, a nexthop down event, or a gateway down event.

15. The apparatus of claim 13, wherein the one or more processors are further configured to classify the first traffic with the first traffic classification by classifying the first traffic with a first endpoint group classification, wherein the one or more processors are further configured to classify the second traffic with the second traffic classification by classifying the second traffic with a second endpoint group classification.

16. The apparatus of claim 15, wherein the one or more processors are further configured to classify the second traffic with the second endpoint group classification by:

performing a look-up in a table stored in the one or more processors based upon the first endpoint group classification and the indication of the network event; and obtaining an indication of the second endpoint group classification in response to the look-up.

17. The apparatus of claim 13, wherein the one or more processors are further configured to obtain the indication of the network event by obtaining a Bidirectional Forwarding Detection protocol message.

18. The apparatus of claim 13, wherein the one or more processors are further configured to obtain the indication of the network event by detecting the network event within the network.

19. One or more tangible, non-transitory computer readable mediums encoded with instructions, wherein the instructions, when executed by one or more processors, are operable to:

generate a first network policy and a second network policy at a forwarding device within a network, wherein the first network policy is pre-programmed to a first traffic classification and the second network policy is pre-programmed to a second traffic classification, wherein the second network policy is a back-up policy of the first network policy;

obtain first traffic from an endpoint device;

classify the first traffic with the first traffic classification;

apply, at the forwarding device, the first network policy to the first traffic;

obtain, at the forwarding device, an indication of a network event within the network;

obtain second traffic from the endpoint device; and remap the second traffic within a predetermined time period by:

classifying the second traffic with the second traffic classification in response to obtaining the indication of the network event, and applying, at the forwarding device, the second network policy to the second traffic in place of the first network policy in response to the indication of the network event, wherein the second network policy is pre-programmed at the forwarding device prior to the network event.

20. The one or more tangible, non-transitory computer readable mediums of claim 19, wherein the instructions operable to classify the first traffic with the first traffic classification comprise instruction operable to classify the first traffic with a first endpoint group classification, wherein the instructions operable to classify the second traffic with the second traffic classification comprise instruction operable to classify the second traffic with a second endpoint group classification.

* * * * *